(12) United States Patent
Sawatari et al.

(10) Patent No.: US 7,553,524 B2
(45) Date of Patent: *Jun. 30, 2009

(54) LIQUID CRYSTAL DISPLAY DEVICE

(75) Inventors: Naoko Sawatari, Tokyo (JP); Masato Okabe, Tokyo (JP); Hideo Hama, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/587,069

(22) PCT Filed: Jan. 19, 2005

(86) PCT No.: PCT/JP2005/000614

§ 371 (c)(1),
(2), (4) Date: Jul. 21, 2006

(87) PCT Pub. No.: WO2005/071475

PCT Pub. Date: Aug. 4, 2005

(65) Prior Publication Data

US 2007/0154652 A1 Jul. 5, 2007

(30) Foreign Application Priority Data

Jan. 22, 2004 (JP) .............................. 2004-014977

(51) Int. Cl.
*C09K 19/02* (2006.01)
*G02F 1/141* (2006.01)
(52) U.S. Cl. ..................... 428/1.2; 349/124; 349/135
(58) Field of Classification Search ........... 428/1.1–1.2; 349/123–124, 135; 252/299.4, 299.68; 345/88–89
See application file for complete search history.

(56) References Cited

U.S. PATENT DOCUMENTS 5,977,942 A * 11/1999 Walker et al. ................. 345/97

(Continued)

FOREIGN PATENT DOCUMENTS

CN       1340592        3/2002

(Continued)

OTHER PUBLICATIONS

Nonaka, T., et al. (1999) Material characteristics of an active matrix LCD based upon chiral smectics. Journal of Liquid Crystals. 26:1599-1602.

(Continued)

*Primary Examiner*—Keith D Hendricks
*Assistant Examiner*—Sophie Hon
(74) *Attorney, Agent, or Firm*—Ladas & Parry LLP (57) ABSTRACT

The invention provides a liquid crystal display using a ferroelectric liquid crystal, which can give mono-domain alignment of the ferroelectric liquid crystal without forming alignment defects which is so remarkably good in alignment stability that the alignment thereof can be maintained even if the temperature of the liquid crystal is raised to the phase transition point or higher. The present invention provides a liquid crystal display comprising a ferroelectric liquid crystal sandwiched between two substrates, wherein an electrode and a photo alignment layer are each successively formed a constituent material of the respective photo alignment layer is a photoreactive material which generates a photoreaction to give anisotropy to the photo alignment layer; and the constituent material of the respective photo alignment layer has different composition from each other with the ferroelectric liquid crystal sandwiched therebetween.

14 Claims, 4 Drawing Sheets

U.S. PATENT DOCUMENTS

| | | | |
|---|---|---|---|
| 6,001,277 A * | 12/1999 | Ichimura et al. | 252/299.4 |
| 6,107,427 A * | 8/2000 | Herr et al. | 526/321 |
| 6,153,272 A * | 11/2000 | Kim et al. | 428/1.5 |
| 6,160,597 A * | 12/2000 | Schadt et al. | 349/98 |
| 6,201,087 B1 | 3/2001 | Herr et al. | |
| 6,733,958 B2 | 5/2004 | Fukuda et al. | |
| 2002/0085153 A1 | 7/2002 | Choi et al. | |
| 2002/0187282 A1* | 12/2002 | Farrand et al. | 428/1.1 |
| 2003/0058210 A1* | 3/2003 | Yamazaki et al. | 345/89 |
| 2003/0127627 A1* | 7/2003 | Amakawa et al. | 252/299.01 |
| 2003/0232930 A1* | 12/2003 | Gibbons et al. | 525/418 |

FOREIGN PATENT DOCUMENTS

| | | | |
|---|---|---|---|
| GB | WO 00/55151 | * | 9/2000 |
| JP | 2003-005223 | | 1/2003 |
| JP | 2003-073562 | | 3/2003 |
| JP | 2003-098529 | | 4/2003 |

OTHER PUBLICATIONS

Patel, J.S. et al. (1986) Alignment of liquid crystals which exhibit cholesteric to smectic C* phase transitions. J. Appl. Phys. 59:2355-2360.

European Search Report, Application No./Patent No. 05709244.7-2205, Feb. 28, 2008.

* cited by examiner

BRIGHT

DARK

LIQUID CRYSTAL DISPLAY DEVICE

TECHNICAL FIELD

The present invention relates to a liquid crystal display using ferroelectric liquid crystal, more specifically, a liquid crystal display in which a photo alignment layer is used to control the alignment of ferroelectric liquid crystal.

BACKGROUND ART

Since liquid crystal displays have features that it is thin and is low in power consumption and other features, the use thereof has been expanding in various articles from large-sized displays to portable information terminals and the development thereof has been actively made.

Conventionally, for liquid crystal displays, a TN system, an STN multiplex driving system, an active matrix driving system in which thin film transistors (TFTs) are used in TN, and others have been developed and made practicable. However, since nematic liquid crystal is used therein, the response speed of the liquid crystal material is as small as several milliseconds to several tens of milliseconds and it cannot be said that these sufficiently cope with display of moving images.

Figure 1:
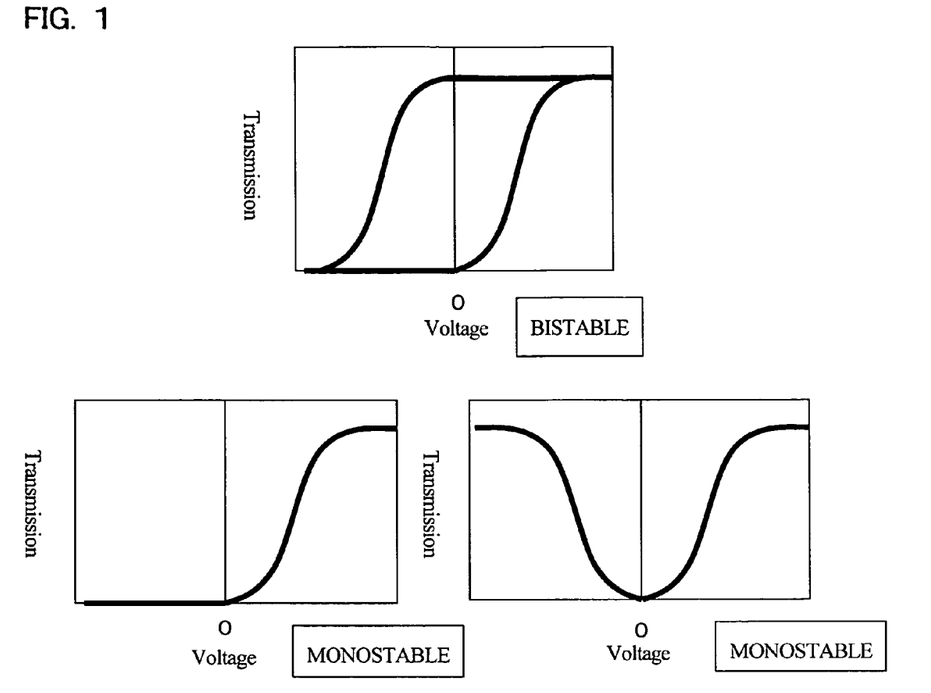
FIG. 1 is a graph showing changes in transmission as a function of voltage applied to ferroelectric liquid crystals.

Ferroelectric liquid crystal (FLC) exhibits a very fast response in order of microseconds, and thus FLC is a liquid crystal suitable for high-speed devices. About ferroelectric liquid crystal, there is well known a bistable liquid crystal which has two stable states when no voltage is applied thereto and is suggested by Clark and Lagerwall (FIG. 1). However, the liquid crystal has a problem that the liquid crystal has memory property but gray scale display cannot be attained since the switching thereof is limited to two states, namely, bright and dark states.

In recent years, attention has been paid to ferroelectric liquid crystal in which the liquid crystal layer thereof is stable in a single state (hereinafter referred to as "monostable") when no voltage is applied thereto as a liquid crystal making it possible to attain gray scale display by the matter that the director (the inclination of the molecule axis) of the liquid crystal is continuously changed by a change in applied voltage so as to analogue-modulate the light transmission thereof (non-patent document 1, FIG. 1). As such liquid crystal exhibiting mono-stability, there is usually used a ferroelectric liquid crystal in which phase change is caused between cholesteric phase (Ch) and chiral smectic C phase (SmC*) via no smectic A phase (SmA). When ferroelectric liquid crystal exhibits mono-stability in this manner, the liquid crystal does not have any memory property and it is desired to drive the liquid crystal through an active matrix system in which an active element such as a transistor or a diode is added to each pixel. In the case of using, in particular, an active matrix system using TFT elements as active elements, high-quality display can be attained since target pixels can be certainly switched on and off.

Figure 2:
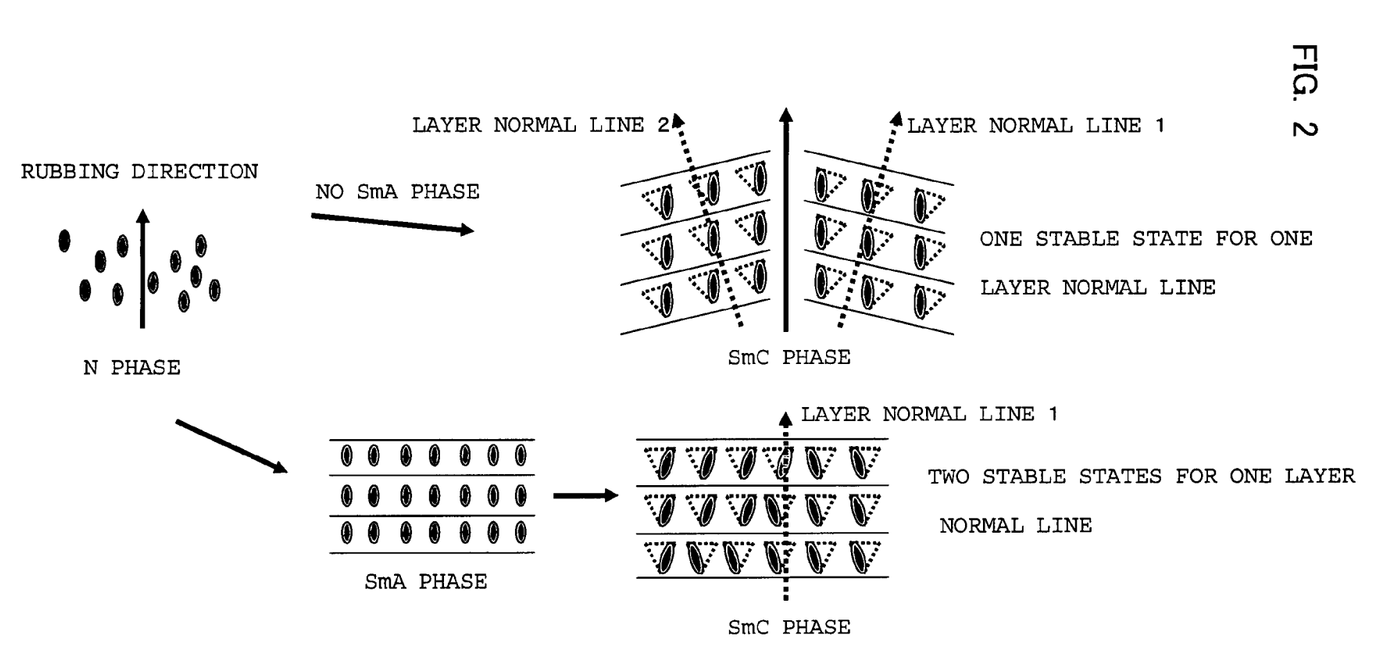
FIG. 2 is a view illustrating a difference of alignment defects based on a difference of the phase series that ferroelectric liquid crystal has.
Figure 3:
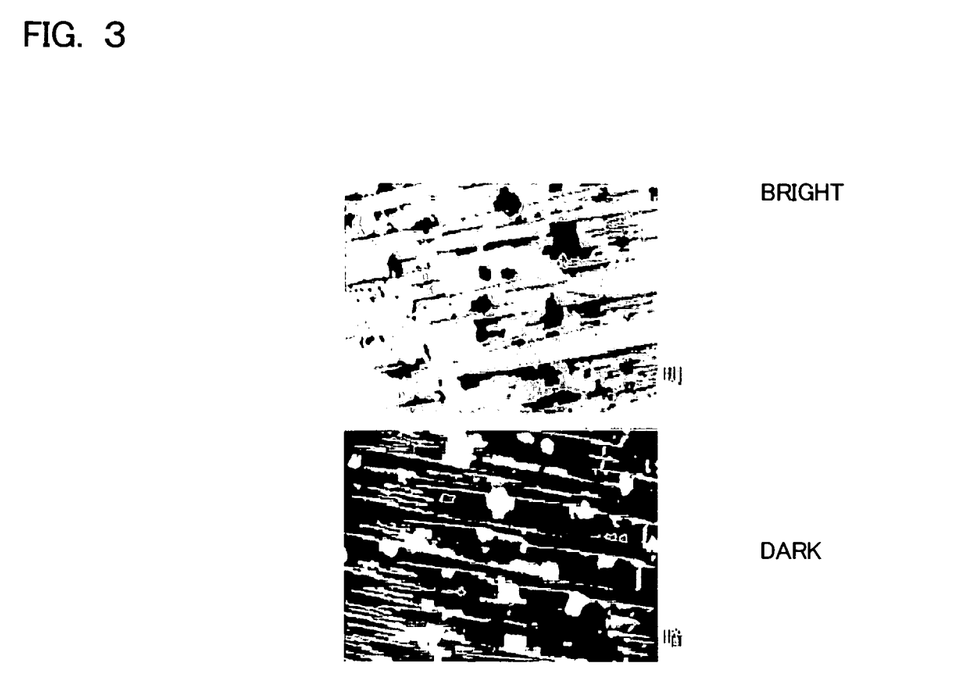
FIG. 3 is a photograph showing double domains which are alignment defects of ferroelectric liquid crystal.

On the other hand, ferroelectric liquid crystal has a higher order of molecules therein than nematic liquid crystal; therefore, the former liquid crystal is not easily aligned so that defects called zigzag defects or hairpin defects are easily generated. Such defects cause a fall in contrast based on light leakage. In particular, ferroelectric liquid crystal undergoing phase transition via no SmA phase generates two domains different in the layer normal-line direction thereof (hereinafter referred to as "double domains") (FIG. 2). The double domains give such display that black and white are reversed so as to cause a serious problem (FIG. 3). As the method for removing the double domains, known is an electric field induced technique (, which uses DC voltage during cooling process) of heating a liquid crystal cell to a temperature not lower than the Ch phase thereof, and then cooling the liquid crystal cell slowly while applying a DC voltage thereto (non-patent document 2). This method has problems that the alignment of the liquid crystal is disturbed when the temperature thereof is again raised to a temperature not lower than the phase transition temperature thereof and the alignment is disturbed in regions where no electric field acts between pixel electrodes, and other problems.

As the technique for subjecting liquid crystal to alignment treatment, there is known a method of using an alignment film. The method is classified into the rubbing method and the photo alignment method. The rubbing method is a method of subjecting a substrate coated with a polyimide film to rubbing treatment to align chains of the polyimide polymer in the direction of the rubbing, thereby aligning liquid crystal molecules on the film. The rubbing method is excellent in controllability of the alignment of nematic liquid crystal, and is generally an industrially applicable technique. However, this method has the following problems: the generation of static electricity and dust, unevenness in the power for regulating the alignment and the tilt angle of liquid crystal caused by differences in rubbing conditions, treatment-uniformity caused when a large area is treated, and so on. Thus, this method is unsuitable as a method for alignment treatment of ferroelectric liquid crystal, in which alignment defects are easily generated. Moreover, the rubbing method cannot overcome double domains.

There is a photo alignment method as a non-contact alignment method substituting the rubbing method. The photo alignment method is a method of radiating light the polarization of which is controlled onto a substrate coated with a polymer film to generate photo-excited reaction (decomposition, isomerization or dimerization) so as to give anisotropy to the polymer film, thereby aligning the liquid crystal molecules on the film. This method is useful since the generation of static electricity or dust, which is a problem in the rubbing method, does not arise and the alignment treatment can be quantitatively controlled. However, even if this method is used, it is difficult to suppress the generation of double domains and obtain mono-domain alignment.

Another method for making ferroelectric liquid crystal monostable is the polymer stabilization method. The polymer stabilization method is a method of injecting a ferroelectric liquid crystal blended with an ultraviolet curable monomer into a liquid crystal cell subjected to alignment treatment, and then radiating ultraviolet rays onto the liquid crystal in the state that an AC or DC voltage is applied thereto, thereby polymerizing the monomer to stabilize the liquid crystal. However, the method has problems that the production process thereof is complicated and the voltage for driving the liquid crystal is high.

As still another method for giving mono-domains, the patent document 1 describes a method of subjecting one out of alignment-films on and beneath a ferroelectric liquid crystal to rubbing treatment, and subjecting the other to photo alignment treatment, thereby aligning the ferroelectric liquid crystal. However, according to this method, there remain problems such as the generation of static electricity or dust and treatment-uniformity generated when a large area is treated, as described above, since only one of the films is rubbed.

On the other hand, in recent years, color liquid crystal displays have been actively developed. The method for realizing color display is generally classified into a color filter system and a field sequential color system. The color filter system is a system of using a white light source as a back light and attaching a micro color filter in R, G or B color to each pixel, thereby realizing color display. On the other hand, the field sequential color system is a system of switching a back light into R, G, B, R, G, B . . . with time, and opening and shutting a black and white shutter of a ferroelectric liquid crystal in synchronization therewith to mix the colors with time by afterimage effect on the retina, thereby realizing color display. This field sequential color system makes it possible to attain color display in each pixel, and does not require any color filter low in transmission. As a result, this system is useful since the system is capable of attaining bright and highly precise color display and realizing low power consumption and low costs. However, the field sequential color system is a system in which each pixel is subjected to time sharing; it is therefore necessary for the liquid crystal as the black and white shutter to have high-speed responsiveness in order to give a good moving image display property. If ferroelectric liquid crystal is used, this problem can be solved. However, the ferroelectric liquid crystal has a problem that alignment defects are easily generated, as described above, and thus the color system using this liquid crystal has not been made practicable.

Patent document 1: Japanese Patent Application Laid-Open No. 2003-5223

Non-patent document 1: NONAKA, T., LI, J., OGAWA, A., HORNUNG, B., SCHMIDT, W., WINGEN, R., and DUBAL, H., 1999, Liq. Cryst., 26, 1599.

Non-patent document 2: PATEL, J., and GOODBY, J. W., 1986, J. Appl. Phys., 59, 2355

DISCLOSURE INVENTION

Problem to be Solved by the Invention

A main object of the present invention is to provide liquid crystal displays using a ferroelectric liquid crystal, which can give mono-domain alignment of the ferroelectric liquid crystal without forming alignment defects such as double domains and which are so remarkably good in alignment stability that the alignment thereof can be maintained even if the temperature of the liquid crystal is raised to the phase transition point or higher.

Means for Solving the Problem

In light of the above-mentioned situation, the inventors have made eager investigation so as to find out that a photo alignment layer is formed on each of opposite faces of two substrates and materials having different compositions are used as the materials of the upper and lower photo alignment layers, whereby the mono-domain alignment of a ferroelectric liquid crystal therebetween can be obtained in the state that alignment defects such as double domains are restrained from being generated. Thus, the present invention has been made.

That is, the present invention provides a liquid crystal display comprising a ferroelectric liquid crystal sandwiched between two substrates, wherein an electrode and a photo alignment layer are each successively formed on opposite faces of the two substrates facing each other; a constituent material of the respective photo alignment layer is a photoreactive material which generates a photoreaction to give anisotropy to the photo alignment layer; and the constituent material of the respective photo alignment layer has different composition from each other with the ferroelectric liquid crystal sandwiched therebetween.

In the present invention, since a photo alignment layer is formed on the each opposite faces of the upper and lower substrates, a constituent material of the photo alignment layers is a photoreactive material which generates photoreaction to give anisotropy to the photo alignment layer, and the photo alignment layers are made of materials of different compositions with the ferroelectric liquid crystal sandwiched therebetween, the effect of aligning the ferroelectric liquid crystal without formation of the alignment defects such as the double domain can be achieved. Since the present invention is a liquid crystal display in which the photo alignment layers are used to conduct alignment treatment without depending on the electric field induced technique (, which uses DC voltage during cooling process), the invention has an advantage that even if the temperature thereof is raised to the phase transition point thereof or higher, the alignment of the liquid crystal can be maintained so as to restrain alignment defects such as double domains from being generated. The photoreaction here denotes the reaction of changing the molecule itself by the light irradiation. By the use of such a photoreactive material, anisotropy can be given easily to the photo alignment layer.

The photoreaction is preferably a photo-dimerization reaction or a photo decomposition reaction. This is because the use of the photoreaction causes anisotropy to be further easily given to the photo alignment layer.

The photoreactive material preferably comprises a photo-dimerization-reactive compound having a radical-polymerizable functional group and dichroism that different absorptivities are exhibited depending on a polarization direction thereof. This is because anisotropy can easily be given to the photo alignment layer by radical-polymerizing its reactive sites aligned in the polarization direction.

The photo-dimerization-reactive compound is preferably a dimerization-reactive polymer containing, as its side chain, any one of cinnamic acid ester, coumalin, and quinoline. This is because anisotropy can easily be given to the photo alignment layer by the radical polymerization in the state that the double bonds in the α, β-unsaturated ketone aligned in parallel to the polarization direction function as reactive sites.

The photo-dimerization-reactive compound is preferably at least one selected from dimerization-reactive polymers represented by the following formulae:

-continued $R^{11}: -A^1+(Z^{11}-B^1)_{\overline{t}}Z^{12}-$ wherein $A^1$ and $B^1$: 1,4-phenylene, a covalent single bond, pyridine-2,5-diyl, pyrimidine-2,5-diyl, 1,4-cyclohexylene or 1,3-dioxane-2,5-diyl;

$Z^{11}$ and $Z^{12}$: —CH$_2$—CH$_2$—, —COO—, —OOC—, or a covalent single bond; t: an integer of 0 to 4;

$R^{12}$: a lower alkyl; and n: an integer of 4 to 30,000.

This is because the dimerization-reactive polymer is small in energy necessary for the reaction thereof and functional groups suitable for the moieties $R^{11}$ and $R^{12}$ can be selected.

It is preferable that the ferroelectric liquid crystal exhibits the mono-stability. By the use of the ferroelectric liquid crystal exhibiting the mono-stability, the effects of the configuration of the present invention can be made more remarkable.

The ferroelectric liquid crystal is preferably a ferroelectric liquid crystal having, in a phase series thereof, no smectic A phase. As described above, the ferroelectric liquid crystal having, in the phase series thereof, no smectic A phase easily generates alignment defects such as double domains. However, when the compositions of the upper and lower photo alignment layers, which sandwich the ferroelectric liquid crystal, are made different from each other, alignment defects such as double domains can be restrained from being generated so that the advantageous effects resulting from the configuration of the present invention become remarkable.

The ferroelectric liquid crystal is preferably a ferroelectric liquid crystal which constitutes a single phase. In the liquid crystal display of the invention, a good alignment can be obtained even if the single-phase ferroelectric liquid crystal is used. Therefore, it is unnecessary to use the polymer stabilization method or the like to control the alignment. Thus, the invention has advantages that the process for the production of the display element becomes simple and the driving voltage thereof can be made low.

The liquid crystal display is preferably an element driven by an active matrix system using thin film transistors (TFTs). This is because the adoption of the active matrix system using TFT elements makes it possible to switch on or off target pixels surely to give high-quality display. Furthermore, it is possible to combine a TFT substrate, in which TFT elements are arranged in a matrix form on one of the substrates, with a common electrode substrate, in which a common electrode is formed in the whole of the display section of the other substrate, to form a micro color filter wherein TFT elements are arranged in a matrix form between the common electrode of the common electrode substrate and the substrate thereof, and use the resultant as color liquid crystal displays.

The liquid crystal display is preferably a liquid crystal display displayed by a field sequential color system for the following reason: the liquid crystal display has fast switching speed and makes it possible to align the ferroelectric liquid crystal therein without forming any alignment defect; therefore, when the liquid crystal display is displayed by the field sequential color system, bright and highly precise display of color moving images which has a wide field angle can be realized at low costs and low power consumption.

Effect of the Invention

The liquid crystal display of the invention is useful since the liquid crystal display makes it possible to align the ferroelectric liquid crystal therein without forming alignment defects such as zigzag defects, hairpin defects or double domains and further the liquid crystal display is a liquid crystal display so remarkably good in alignment stability that the alignment is not easily disturbed even if the temperature thereof is raised to the phase transition point thereof or higher.

EXPLANATION OF REFERENCES

1 . . . liquid crystal layer
2a, 2b . . . photo alignment layer
3a . . . common electrode
3b . . . x electrode
3c . . . y electrode
3d . . . pixel electrode
4a, 4b . . . substrate
5a, 5b . . . polarizing plate
7 . . . TFT element

BEST MODE FOR CARRYING OUT THE INVENTION

The liquid crystal display of the present invention will be described in detail hereinafter. The liquid crystal display of the invention is a liquid crystal display comprising a ferroelectric liquid crystal sandwiched between two substrates in which an electrode and a photo alignment layer are successively formed on each of opposite faces of the two substrates, and the constituent materials of the photo alignment layers have compositions different from each other so as to sandwich the ferroelectric liquid crystal.

Figure 4:
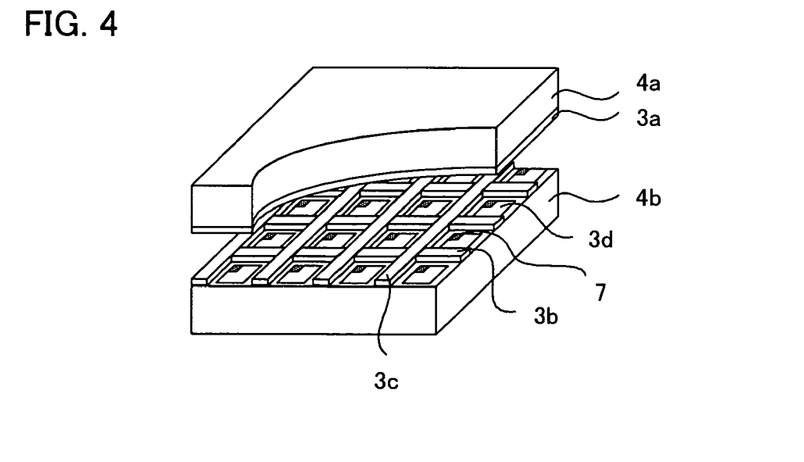
FIG. 4 is a schematic perspective view illustrating one example of the liquid crystal display of the present invention.
Figure 5:
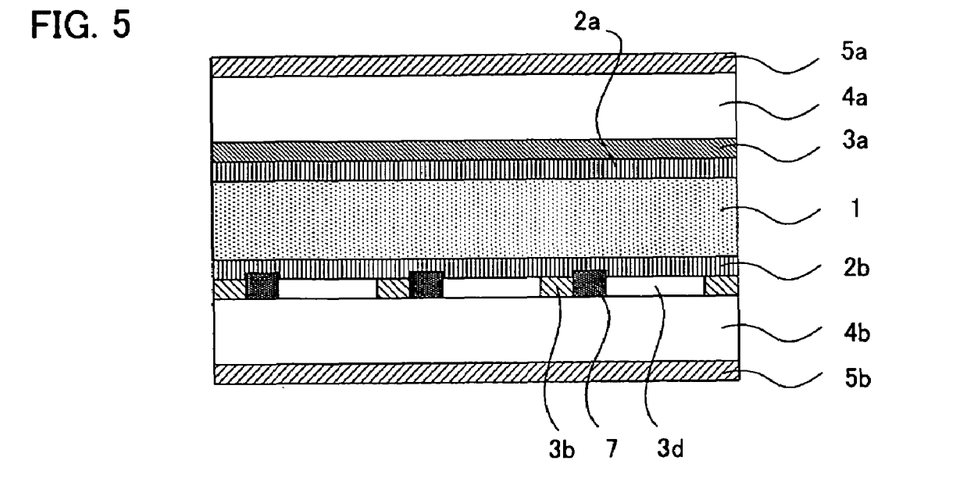
FIG. 5 is a schematic sectional view illustrating the example of the liquid crystal display of the present invention.

The liquid crystal display of the invention will be described with reference to the drawings. FIG. 4 is a schematic perspective view illustrating one example of the liquid crystal display of the present invention. FIG. 5 is a schematic sectional view thereof. As shown in FIGS. 4 and 5, a common electrode 3a is formed on a substrate 4a, and x electrodes 3b, y electrodes 3c and pixel electrodes 3d are formed on an opposite substrate 4b. Inside an electrode layer that these electrodes constitute are formed photo alignment layers 2a and 2b. A ferroelectric liquid crystal is sandwiched between the photo alignment layers 2a and 2b to constitute a liquid crystal layer 1. In FIG. 4, the illustration of photo alignment layers 2a and 2b is omitted.

Polarizing plates 5a and 5b may be formed outside of the substrates 4a and 4b. This makes it possible to convert incident light into linear polarized light so that the display element can transmit only light polarized in the alignment direction of the liquid crystal molecules. The polarizing plates 5a and 5b are arranged in such a manner that the polarization direction thereof is twisted at 90°. This makes it possible to control the direction of the optical axis of the liquid crystal molecules or the magnitude of the birefringence of the liquid crystal molecules between states that voltage is not applied thereto and is applied thereto, and to produce a bright state and a dark state by use of the ferroelectric liquid crystal molecules as a black and white shutter. For example, in the state that no voltage is applied, the light transmitted through the polarizing plate 5$a$ cannot be caused to rotate its polarization direction at an angle of 90° by setting the polarizing plate 5$a$ to make consistent with the alignment of the liquid crystal molecules. Consequently, this light is blocked by the polarizing plate 5$b$ so that the liquid crystal is turned into a dark state. On the other hand, in the state that voltage is applied, the direction of the liquid crystal molecules are changed by the voltage so that the optical axis thereof rotates by an angle of θ from the initial state, whereby the polarization direction of the light is twisted at 90°. As a result, the light is transmitted through the polarizing plate 5$b$ so that the liquid crystal is turned into a bright state. When the quantity of the transmitted light is controlled in accordance with the applied voltage, gray scale display can be attained.

The liquid crystal display of the invention has a photo alignment layer on each of opposite faces of upper and lower substrates and the photo alignment layers are made of materials different from each other to sandwich a ferroelectric liquid crystal as described above, thereby making it possible to restrain the generation of alignment defects such as zigzag defects, hairpin defects and double domains and yield the mono-domain alignment of the ferroelectric liquid crystal. The present invention causes the ferroelectric liquid crystal to be aligned without using the electric field induced technique (which uses DC voltage during cooling process); therefore, the invention has advantages that alignment disturbance, which is based on a rise in the temperature of the liquid crystal up to not lower than the phase transition point thereof and is a problem of the electric field induced technique, is not easily generated so that the invention is excellent in alignment stability. There as on why the use of materials different in composition, as the constituent materials of the photo alignment layers, gives a good alignment state is unclear, but would be based on the difference of the interaction between the upper photo alignment layer and the ferroelectric liquid crystal and between the lower photo alignment layer and the ferroelectric liquid crystal. Since a ferroelectric liquid crystal is used as a black and white shutter in the liquid crystal display of the invention as described above, the display element has an advantage that the response speed thereof can be made large.

As shown in, for example, FIG. 4, the liquid crystal display of the present invention is preferably a display in which one of the substrates is rendered a TFT substrate in which thin film transistors (TFTS) 7 are arranged in a matrix form, the other substrate is rendered a common electrode substrate having the common electrode 3$a$ formed on the whole area thereof, and the two substrates are combined with each other. Such liquid crystal display of an active matrix system using TFT elements will be described hereinafter.

In FIG. 4, in one of the substrates, its electrode is the common electrode 3$a$, and thus the substrate is a common electrode substrate. On the other hand, in the opposite substrate, its electrodes are composed of the x electrodes 3$b$, the y electrodes 3$c$ and the pixel electrodes 3$d$, and thus the substrate is a TFT substrate. In this liquid crystal display, the electrodes 3$b$ and the y electrodes 3$c$ are arranged lengthwise and crosswise, respectively. When signals are added to these electrodes, the TFT elements 7 are worked so as to drive the ferroelectric liquid crystal. Regions where the x electrodes 3$b$ and the y electrodes 3$c$ cross are insulated with an insulator layer, which is not illustrated. Signals to the x electrodes 3$b$ and signals to the y electrodes 3$c$ can be independently operated. Any region surrounded by the x electrodes 3$b$ and the y electrodes 3$c$ is a pixel, which is a minimum unit for driving the liquid crystal display of the invention. At least one out of the TFT elements 7 and at least one out of the pixel electrodes 3$d$ are fitted to each of the pixels. In the liquid crystal display of the invention, the TFT elements 7 of the respective pixels can be worked by applying signal voltages successively to the x electrodes 3$b$ and the y electrodes 3$c$.

Furthermore, the liquid crystal display of the invention can be used as color liquid crystal displays by forming a micro color filter in which TFT elements 7 are arranged in a matrix form between the common electrode 3$a$ and the substrate 4$a$. Each of the constituent members of the liquid crystal display of the invention, as described above, will be described in detail hereinafter.

1. Constituent Members of Liquid Crystal Display (1) Photo Alignment Layers

The photo alignment layer is a film, wherein light the polarization of which is controlled is radiated onto a substrate coated with a polymer film to generate photo-excited reaction (decomposition, isomerization or dimerization) of the polymer, thereby giving anisotropy into the polymer film to align liquid crystal molecules on this film.

The constituent material of the photo alignment layer used in the invention is not limited to any especial kind if the material has an effect of generating photo-excited reaction by the irradiation thereof with light to align the ferroelectric liquid crystal thereon (photoaligning) Such a material can be roughly classified into a photo-isomerizable type, in which only the shape of the molecule thereof changes so that the alignment thereof can reversibly change, and a photoreactive type, in which the molecule itself changes. Among these, in the present invention, a photoreactive material which generates photoreaction to give anisotropy to the photo alignment layer is preferable. By the use of the photoreactive material, anisotropy can be given easily to the photo alignment layer.

The wavelength range of light which causes photo-excited reaction in the constituent materials of the photo alignment layers is preferably within the wavelength range of ultraviolet rays, that is, the range of 10 to 400 nm, more preferably within the range of 250 to 380 nm.

The photoreaction is not limited to any especial kind if the reaction can change the molecule itself by the irradiation with light to supply anisotropy to the photoaligning of the photo alignment layer. Photo-dimerization reaction or photo decomposition reaction is more preferable since the supply of the anisotropy to the photo alignment layer becomes easier. The photo-dimerization reaction is a reaction that two molecules are polymerized by radical polymerization of their reactive sites aligned in the direction of polarization through the irradiation thereof with light. This reaction makes it possible to stabilize the alignment in the polarization direction to give anisotropy to the photo alignment layer. On the other hand, the photo decomposition reaction is a reaction which decomposes a molecule chain of polyimide or the like which is aligned in the direction of polarization by the irradiation thereof with light. This reaction makes it possible to give anisotropy to the photo alignment layer in the state that the molecule chain aligned in the direction perpendicular to the polarization direction remains. Examples of the photoreactive material using the photo decomposition reaction include a polyimide "RN 1199" manufactured by NISSAN CHEMICAL INDUSTRIES, LTD. It is more preferable in the invention to use, out of these photoreactive materials, materials which give anisotropy to the photo alignment layer by the photo-dimerization reaction since the materials are high in exposure sensitivity and the scope of material-selection is wide.

The photoreactive material using photo-dimerization reaction is not limited to any especial kind if the material can give anisotropy to the photo alignment layer by photo-dimerization reaction. The material preferably comprises a photo-dimerization-reactive compound having a radical-polymerizable functional group and dichroism that different absorptivities are exhibited depending on the polarization direction thereof. This is because the alignment of the photo-dimerization-reactive compound is stabilized and anisotropy can easily be given to the photo alignment layer by radical-polymerizing its reactive sites aligned in the polarization direction.

Examples of the photo-dimerization-reactive compound include dimerization-reactive polymers each having, as its side chain, at least one reactive site selected from cinnamic acid ester, coumalin, quinoline, a chalcone group and a cinnamoyl group.

Of these, the following is preferred as the photo-dimerization-reactive compound having such properties: a dimerization-reactive polymer having, as its side chain, any one of cinnamic acid ester, coumalin and quinoline. This is because the compound is radical-polymerized in the state that the double bonds in the α, β-unsaturated ketone aligned in the polarization direction function as reactive sites, whereby anisotropy can easily be given to the photo alignment layer.

The main chain of the dimerization-reactive polymer is not limited to any especial kind if the main chain is a chain that is generally known as a polymer main chain. It is preferably a chain which does not have a substituent containing many π electrons, which hinder interactions between the reactive sites of the above-mentioned side chain, and an example of the substituent being an aromatic hydrocarbon group.

The weight-average molecular weight of the dimerization-reactive polymer is not especially limited. It is preferably from 5,000 to 40,000, more preferably from 10,000 to 20,000. The weight-average molecular weight can be measured by gel permeation chromatography (GPC). If the weight-average molecular weight of the dimerization-reactive polymer is too small, an appropriate anisotropy may not be given to the photo alignment layer. Conversely, if it is too large, the viscosity of the coating solution at the time of the formation of the photo alignment layer is so high that a homogeneous coat film may not easily be formed.

As the dimerization-reactive polymer, a compound represented by the following formula (1) can be illustrated:

(1)

In the formula (1), $M^1$ and $M^2$ each independently represents a monomer unit of a homopolymer or a copolymer. Examples thereof include an ethylene, an acrylate, a methacrylate, a 2-chloroacrylate, an acrylamide, a methacrylamide, a 2-chloroacrylamide, styrene derivatives, maleic acid derivatives, and a siloxane. $M^2$ may be an acrylonitrile, a methacrylonitrile, a methacrylate, a methyl methacrylate, a hydroxyalkyl acrylate or a hydroxyalkyl methacrylate. x and y each represents the mole ratio of each of the monomer units when the units are polymerized into a copolymer, and is each a number satisfying: $0<x \leq 1$, $0 \leq y<1$, and $x+y=1$. n represents an integer of 4 to 30,000. $D^1$ and $D^2$ each represents a spacer unit.

$R^1$ is a group represented by -A-$(Z^1$-B$)_z$-$Z^2$-, and $R^2$ is a group represented by -A-$(Z^1$-B$)_z$-$Z^3$-. A and B each independently represents a covalent single bond, a pyridine-2,5-diyl, a pyrimidine-2,5-diyl, a 1,4-cyclohexylene, a 1,3-dioxane-2,5-diyl, or a 1,4-phenylene which may have a substituent. $Z^1$ and $Z^2$ each independently represents a covalent single bond, —CH$_2$—CH$_2$—, —CH$_2$O—, —OCH$_2$—, —CONR—, —RNCO—, —COO— or —OOC—. R is a hydrogen atom or a lower alkyl group. $Z^3$ is a hydrogen atom, an alkyl or alkoxy which has 1 to 12 carbon atoms and may have a substituent, a cyano, a nitro or a halogen. z is an integer of 0 to 4. $E^1$ represents a photo-dimerization-reactive site, examples of which include a cinnamic acid ester, a coumalin, a quinoline, a chalcone group and a cinnamoyl group. j and k are each independently 0 or 1.

In the present invention, the compositions of the upper and lower photo alignment layers can be different by variously selecting the photo-dimerization reactive site or the substituent according to the required characteristics out of the compounds represented by the above-mentioned formula (1) as the photo-dimerization-reactive compound. In this case, the photo dimerization reactive sites of the photo-dimerization-reactive compounds used for the upper and lower photo alignment layers may either be same or different. Moreover, as a photo-dimerization-reactive compound, the compounds may be used in combination of two or more kinds. In this case, the photo alignment layer compositions can be changed by changing the combination as well. Furthermore, in the case of using the same combination, by changing the addition amounts of each compound, the compositions of the upper and lower photo alignment layers can be different.

More preferable examples of this dimerization-reactive polymer include compounds represented by the following formulae:

$R^{11}: -A^1-(Z^{11}-B^1)_t-Z^{12}-$ wherein $A^1$ and $B^1$: 1,4-phenylene, a covalent single bond, pyridine-2,5-diyl, pyrimidine-2,5-diyl, 1,4-cyclohexylene or 1,3-dioxane-2,5-diyl;

$Z^{11}$ and $Z^{12}$: —CH$_2$—CH$_2$—, —COO—, —OOC—, or a covalent single bond; t: an integer of 0 to 4;

$R^{12}$: a lower alkyl; and n: an integer of 4 to 30,000.

Of the above-mentioned dimerization-reactive polymers, particularly preferable is at least one of compounds 1 to 4 represented by the following formulae:

photo-dimerization-reactive compound. If the added amount of the polymerization initiator or the polymerization inhibitor is too small, the polymerization may not be initiated (or inhibited). Conversely, if the amount is too large, the reaction may be hindered.

As mentioned above, in the present invention, the constituent materials of the photo alignment layer 2a and the photo alignment layer 2b have different compositions. The compositions of the upper and lower photo alignment layers can be changed by variously selecting the photo dimerization reactive polymers to be used, or the compositions can be changed by changing the addition amounts of the additives as well.

The following will describe the photo alignment treatment method. First, the face of an electrode-formed substrate which is to oppose to a liquid crystal layer is coated with a coating solution in which the above-mentioned constituent material of the photo alignment layer is diluted with an organic solvent, and then the solution is dried. In this case, the content of the photo-dimerization-reactive compound in the

1

2

3

4

The photoreactive material using photo-dimerization reaction may contain additives besides the above-mentioned photo-dimerization-reactive compound as long as the photo-aligning of the photo alignment layer is not hindered. Examples of the additives include a polymerization initiator and a polymerization inhibitor.

It is advisable to select the polymerization initiator or the polymerization inhibitor appropriately from generally-known compounds in accordance with the kind of the photo-dimerization-reactive compound and then use the selected one. The added amount of the polymerization initiator or the polymerization inhibitor is preferably from 0.001 to 20% by weight, more preferably from 0.1 to 5% by weight of the coating solution is preferably from 0.05 to 10% by weight, more preferably from 0.2 to 2% by weight. If the content of photo-dimerization-reactive compound is too small, an appropriate anisotropy is not easily given to the photo alignment layer. Conversely, if the content is too large, the viscosity of the coating solution becomes so high that a homogeneous coat film is not easily formed.

The coating method which can be used is spin coating, roll coating, rod bar coating, spray coating, air knife coating, slot die coating, wire bar coating or the like.

The thickness of the polymer film obtained by the coating with the constituent material is preferably from 1 to 200 nm, more preferably from 3 to 100 nm. If the thickness of the polymer film is too small, a sufficient photoaligning may not be obtained. Conversely, if the thickness is too large, the alignment of the liquid crystal molecules may be disturbed and further, costs there for are not preferred.

The resultant polymer film causes photo-excited reaction by the irradiation thereof with light the polarization of which is controlled, whereby anisotropy can be given. The wavelength range of the radiated light should be appropriately selected in accordance with the constituent material of the used photo alignment layer. It is preferably the range of ultraviolet ray wavelengths, that is, the range of 100 to 400 nm, more preferably the range of 250 to 380 nm.

The direction of the polarization is not especially limited if the direction makes it possible to generate the photo-excited reaction, and is preferably in the range of 0° to 45° oblique to the substrate face of the upper and lower photo alignment layers, more preferably in the range of 20° to 45° oblique thereto since the alignment state of the ferroelectric liquid crystal can be made good.

(2) Liquid Crystal Layer

The liquid crystal layer used in the invention is made by sandwiching a ferroelectric liquid crystal between the photo alignment layers. The ferroelectric liquid crystal used in the liquid crystal layer is not limited to any especial kind if the ferroelectric liquid crystal exhibits a chiral smectic C phase (SmC*). The liquid crystal is preferably a ferroelectric liquid crystal material the phase series of which is a phase change from a cholesteric phase (Ch) to a chiral smectic C phase (SmC*) via no smectic A phase (SmA).

The liquid crystal display of the present invention is preferably driven by an active matrix system using thin film transistors (TFTs), and can be rendered color liquid crystal displays by adopting a color filter system or a field sequential color system. In such a case, a material the phase of which changes from a Ch phase through a SmA phase to a SmC* phase can be used as the ferroelectric liquid crystal. Alternatively, a material the phase of which changes from a Ch phase to a SmC* phase via no SmA phase may be used. However, in the case of driving the liquid crystal display of the invention, in particular, by a field sequential color system, it is preferable to use a liquid crystal material having mono-stability and undergoing phase transition via no SmA phase. The mono-stability herein means a nature that liquid crystal has only one stable state when no voltage is applied thereto, as described above. Particularly preferable is a ferroelectric liquid crystal undergoing half-V-shaped driving, in which liquid crystal molecules thereof work only when either one of positive and negative voltages is applied thereto since the liquid crystal makes it possible to lengthen the aperture time of a black and white shutter and realize bright color display.

The ferroelectric liquid crystal used in the invention is preferably one constituting a single phase. The word "constituting a single phase" means that a polymer network, as formed by the polymer stabilization method or the like, is not formed. Such use of the ferroelectric liquid crystal of a single phase produces an advantage that the production process becomes simple and the driving voltage can be made low.

The ferroelectric liquid crystal used in the invention may be, for example, "R2301" sold by Clariant(Japan) K.K.

The thickness of the liquid crystal layer made of the above-mentioned ferroelectric liquid crystal is preferably from 1.2 to 3.0 µm; more preferably from 1.3 to 2.5 µm; and even more preferably from 1.4 to 2.0 µm. If the thickness of the liquid crystal layer is too small, the contrast may lower. Conversely, if the thickness is too large, the liquid crystal may not be aligned with ease.

As the method for forming the liquid crystal layer, a method which is generally used as a method for forming a liquid crystal cell can be used. For example, the liquid crystal layer can be formed, by making use of capillary effect to inject an isotropic liquid obtained by heating the above-mentioned ferroelectric liquid crystal into a liquid crystal cell, which is formed by forming electrodes beforehand on a substrate and arranging the above-mentioned photo alignment layer, and then sealing the cell with an adhesive agent. The thickness of the liquid crystal layer can be adjusted with spacers such as beads.

(3) Substrate

The substrate used in the invention is not limited to any especial kind if the substrate can be generally used as a substrate of liquid crystal display. Preferred examples thereof include glass plates and plastic plates. The surface roughness (RSM value) of the substrate is preferably 10 nm or less; more preferably 3 nm or less; and even more preferably 1 nm or less. The surface roughness in the invention can be measured with an atomic force microscope (AFM).

(4) Electrodes

The electrodes used in the invention are not limited to any especial kind if the electrodes are electrodes which are generally used as electrodes of liquid crystal displays. At least one of the electrodes is preferably an electrode made of a transparent conductor. Preferred examples of the material of the transparent conductor include an indium oxide, a tin oxide, and an indium tin oxide (ITO). In the case of rendering the liquid crystal display of the invention a liquid crystal display of an active matrix system using TFT elements, one of upper and lower electrodes is rendered a full-face common electrode made of the transparent conductor and the other is rendered an electrode in which x electrodes and y electrodes are arranged in a matrix form and a TFT element and a pixel electrode are arranged in a region surrounded by each of the x electrodes and each of the y electrodes. In this case, the difference between concave and convex portions of an electrode layer made of the pixel electrodes, the TFT elements, the x electrodes and the y electrodes is preferably 0.2 µm or less. If the difference between the concave and convex portions of the electrode layer is over 0.2 µm, alignment disturbance is easily generated.

About the above-mentioned electrodes, a transparent electroconductive film can be formed on the above-mentioned substrate by a vapor deposition method such as CVD, sputtering, or ion plating, and then this is patterned into a matrix form, whereby the x electrodes and the y electrodes can be obtained.

(5) Polarizing Plate

The polarizing plate used in the invention is not limited to any especial kind if the plate is a member for transmitting only a specific direction of wave motions of light. It is possible to use a member which is generally used as a polarizing plate for liquid crystal displays.

2. Process for Producing Liquid Crystal Display

The liquid crystal display of the invention can be produced by a process that is generally used as a process for producing liquid crystal displays. The following will describe a process for producing liquid crystal displays of an active matrix system using TFT elements as one example of the process for producing the liquid crystal display of the invention. A transparent electroconductive film is first formed on a substrate by the above-mentioned vapor deposition method, so as to form a full-face common electrode. A transparent electroconductive film is patterned into a matrix form on the other substrate to form x and y electrodes, and switching elements and pixel electrodes are set up.

Next, the two substrates, on which the electrodes are formed, are coated with photo alignment layer materials having different compositions, respectively, and then subjected to photo alignment treatment to form photo alignment layers. Beads are dispersed, as spacers, onto one of the thus-formed photo alignment layers, and a sealing agent is applied to the periphery thereof. The two substrates are stuck onto each other so as to make the photo alignment layers opposite to each other. The substrates are then thermally compressed. Capillary effect is used to inject a ferroelectric liquid crystal, in an isotropic liquid state, from an injecting port thereinto, and then the injecting port is sealed with an ultraviolet curing resin or the like. Thereafter, the ferroelectric liquid crystal is slowly cooled, whereby the liquid crystal can be aligned. Polarizing plates are stuck onto the upper and the lower of the thus-obtained liquid crystal cell, whereby the liquid crystal display of the present invention can be yield.

3. Usage of Liquid Crystal Display

The liquid crystal display of the present invention can be used as color liquid crystal displays by adopting a color filter system or a field sequential color system. Since the color liquid crystal displays using the liquid crystal display of the invention make it possible to align ferroelectric liquid crystal without generating alignment defects such as double domains, it is possible to realize highly precise color display having a wide field angle and high-speed responsibility.

It is preferred to display the liquid crystal display of the invention by the field sequential color system out of these for the following reason. As described above, the field sequential color system is a system in which each pixel is subjected to time sharing, and thus high-speed responsibility is particularly necessary in order to obtain a good moving image display characteristic.

In this case, it is preferred to use a liquid crystal material having mono-stability, in which a SmC* phase is exhibited from a Ch phase via no SmA phase, and it is particularly preferred to use a material undergoing half-V-shaped driving, in which liquid crystal molecules thereof work only when either one of positive and negative voltages is applied thereto. When such a material undergoing half-V-shaped driving is used, it is possible to make light leakage less when dark regions operate (when a black and white shutter is closed), and make the aperture time of the black and white shutter sufficiently long. This makes it possible to display respective colors switched with time more brightly to realize bright color liquid crystal displays.

The present invention is not limited to the above-mentioned embodiments. The embodiments are examples, and all modifications having substantially the same structure and producing the same effects and advantages as the technical concept recited in the claims of the present invention are included in the technical scope of the invention.

EXAMPLES

The present invention will be described in more detail by way of the following examples. Compounds 1 to 4 represented by the following formulae were used as photo-dimerization-reactive polymers.

1

2

3

4

Example 1

A 2% by weight solution of the compound 1 dissolved in a cyclopentanone and a 2% by weight solution of the compound 2 dissolved in a cyclopentanone were spin coated on two glass substrates each coated with ITO by the 4,000 rpm rotational frequency for 30 seconds. The substrate spin-coated was dried at 180° C. in an oven for 10 minutes, and then polarized ultraviolet rays were radiated onto the substrate at 100 mJ/cm$^2$ from an angle of 30° to the substrate face at 25° C. Spacers of 1.5 μm size were sprayed onto one of the substrates, and a sealing material was applied onto the other substrate with a seal disperser. Thereafter, the substrates were fabricated in parallel to the radiation direction of the polarized ultraviolet rays and in an anti-parallel state, and then thermally compressed. As the liquid crystal, an "R2301" (manufactured by Clariant (Japan) K.K.) was used. The liquid crystal was attached to the upper of an injecting port thereof, and an oven was used to perform the injection of the liquid crystal at a temperature higher by 10 to 20° C. than the phase transition temperature between nematic and isotropic phases. The temperature was slowly returned to room temperature so that a mono-domain phase having no alignment defects was obtained.

Example 2

A 2% by weight solution of the compound 1 dissolved in a cyclopentanone and a 2% by weight solution of the compound 3 dissolved in a cyclopentanone were spin coated on two glass substrates each coated with ITO by the 4,000 rpm rotational frequency for 30 seconds. Furthermore, they were dried, subjected to exposure treatment and fabricated into a cell, and then the liquid crystal was injected thereinto under the above-mentioned conditions. As a result, a mono-domain phase without an alignment defect was obtained.

Example 3

A 2% by weight solution of the compound 1 dissolved in a cyclopentanone and a 2% by weight solution of the compound 4 dissolved in a cyclopentanone were spin coated on two glass substrates each coated with ITO by the 4,000 rpm rotational frequency for 30 seconds. Furthermore, they were dried, subjected to exposure treatment and fabricated into a cell, and then the liquid crystal was injected thereinto under the above-mentioned conditions. As a result, a mono-domain phase without an alignment defect was obtained.

Example 4

Two glass substrates each coated with ITO were spin-coated with a 2% by weight solution of the compound 1 dissolved in cyclopentanone and a polyimide "RN1199" produced by NISSAN CHEMICAL INDUSTRIES, LTD., respectively, at a rotation frequency of 4000 rpm for 30 seconds. Except that the "RN1199" was exposed by a 10 J/cm$^2$ polarized ultraviolet ray, they were dried, subjected to exposure treatment and fabricated into a cell, and then the liquid crystal was injected thereinto under the above-mentioned conditions. As a result, a mono domain phase without an alignment defect was obtained.

Comparative Example 1

Two glass substrates each coated with ITO were spin-coated with a 2% by weight solution of the compound 1 dissolved in cyclopentanone, at a rotation frequency of 4000 rpm for 30 seconds. Furthermore, they were dried, subjected to exposure treatment and fabricated in to a cell, and then the liquid crystal was injected thereinto under the above-mentioned conditions. As a result, no mono-domain phase was obtained, and alignment defects such as double domains, zigzag defects and hairpin defects were generated.

The invention claimed is:

1. A liquid crystal display comprising a ferroelectric liquid crystal layer sandwiched between two substrates,
   wherein an electrode and a photo alignment film are each successively formed on opposite faces of the two substrates facing each other;
   wherein a constituent material of the respective photo alignment layer is a photoreactive material which generates a photoreaction to give an isotropy to the photo alignment layer, the photoreaction of the constituent material of one respective photo alignment layer being a photo-dimerization reaction; and
   the constituent material of the respective photo alignment layer has a different composition from each other with the ferroelectric liquid crystal layer sandwiched therebetween; and
   wherein a ferroelectric liquid crystal in the ferroelectric liquid crystal layer is a liquid crystal having no smectic A phase in a phase series thereof, exhibiting monostability and undergoing half V-shaped driving; and
   further wherein the ferroelectric liquid crystal forms mono-domain alignment in the ferroelectric liquid crystal layer.

2. The liquid crystal display according to claim 1, wherein the photoreaction of the constituent material of the other respective photo alignment layer is a photo-dimerization reaction or a photo decomposition reaction.

3. The liquid crystal display according to claim 2, wherein the ferroelectric liquid crystal is a liquid crystal which constitutes a single phase.

4. The liquid crystal display according to claim 2, wherein the liquid crystal display is driven by an active matrix system using a thin film transistor.

5. The liquid crystal display according to claim 2, wherein the liquid crystal display is displayed by a field sequential color system.

6. The liquid crystal display according to claim 1, wherein the photoreactive material comprises a photo-dimerization-reactive compound having a radical-polymerizable functional group and dichroism that different absorptivities are exhibited depending on a polarization direction thereof.

7. The liquid crystal display according to claim 6, wherein the photo-dimerization-reactive compound is a dimerization-reactive polymer containing, as its side chain, any one of cinnamic acid ester, coumarin, and quinoline.

8. The liquid crystal display according to claim 7, wherein the photo-dimerization-reactive compound is at least one selected from dimerization-reactive polymers represented by the following formulae:

-continued $R^{11}$: —$A^1$—$(Z^{11}-B^1)_t$—$Z^{12}$— in which $A^1$ and $B^1$: 1,4-phenylene, a covalent single bond, pyridine-2,5-diyl, pyrimidine-2,5-diyl, 1,4-cyclohexylene or 1,3-dioxane-2,5-diyl;

$Z^{11}$ and $Z^{12}$: —$CH_2$—$CH_2$—, —COO—, —OOC—, or a covalent single bond;

t: an integer of 0 to 4;

$R^{12}$: a lower alkyl; and n: an integer of 4 to 30,000.

9. The liquid crystal display according to claim 6, wherein the photo-dimerization-reactive compound is at least one selected from dimerization-reactive polymers represented by the following formulae:

in which $A^1$ and $B^1$: 1,4-phenylene, a covalent single bond, pyridine-2,5-diyl, pyrimidine-2,5-diyl, 1,4-cyclohexylene or 1,3-dioxane-2,5-diyl;

$Z^{11}$ and $Z^{12}$: —$CH_2$—$CH_2$—, —COO—, —OOC—, or a covalent single bond;

t: an integer of 0 to 4:

$R^{12}$: a lower alkyl; and n: an integer of 4 to 30,000.

10. The liquid crystal display according to claim 2, wherein the photoreactive material comprises a photo-dimerization-reactive compound having a radical-polymerizable functional group and dichroism that different absorptivities are exhibited depending on a polarization direction thereof.

11. The liquid crystal display according to claim 10, wherein the photo-dimerization-reactive compound is a dimerization-reactive polymer containing, as its side chain, any one of cinnamic acid ester, coumarin, and quinoline.

12. The liquid crystal display according to claim 1, wherein the ferroelectric liquid crystal is a liquid crystal which constitutes a single phase.

13. The liquid crystal display according to claim 1, wherein the liquid crystal display is driven by an active matrix system using a thin film transistor.

14. The liquid crystal display according to claim 1, wherein the liquid crystal display is displayed by a field sequential color system.

* * * * *